United States Patent
Anvari

(10) Patent No.: US 9,444,988 B2
(45) Date of Patent: Sep. 13, 2016

(54) FAST IMAGE SENSOR FOR BODY PROTECTION GEAR OR EQUIPMENT

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 123 days.

(21) Appl. No.: 14/161,949

(22) Filed: Jan. 23, 2014

(65) Prior Publication Data
US 2015/0206322 A1    Jul. 23, 2015

(51) Int. Cl.
| G06K 9/32 | (2006.01) |
| H04N 5/232 | (2006.01) |
| H04N 5/225 | (2006.01) |
| A42B 3/04 | (2006.01) |
| G06K 9/00 | (2006.01) |

(52) U.S. Cl.
CPC ........ H04N 5/23206 (2013.01); H04N 5/2258 (2013.01); A42B 3/046 (2013.01); G06K 9/00785 (2013.01); G06K 9/00791 (2013.01)

(58) Field of Classification Search
None
See application file for complete search history.

(56) References Cited

U.S. PATENT DOCUMENTS

| 8,706,067 | B1 | 4/2014 | Anvari | |
| 8,891,696 | B1 | 11/2014 | Anvari | |
| 8,947,195 | B1 | 2/2015 | Anvari | |
| 9,007,217 | B1 | 4/2015 | Anvari | |
| 9,075,405 | B1 | 7/2015 | Anvari | |
| 9,076,325 | B1 | 7/2015 | Anvari | |
| 9,262,910 | B1 | 2/2016 | Anvari | |
| 2008/0048931 | A1* | 2/2008 | Ben-Ari | A42B 3/0433 345/8 |
| 2009/0131165 | A1* | 5/2009 | Buchner | A63F 13/02 463/30 |
| 2012/0081544 | A1* | 4/2012 | Wee | G01S 17/023 348/140 |
| 2012/0281878 | A1* | 11/2012 | Matsuda | G06T 7/0046 382/103 |
| 2013/0335611 | A1* | 12/2013 | Roman | G06Q 99/00 348/333.01 |

* cited by examiner

*Primary Examiner* — Chan Park
*Assistant Examiner* — Mai Tran

(57) ABSTRACT

An image sensor for body protection gear and equipment for monitoring and detection of impacts from surrounding object. The image sensor comprises multiple image processors to record images, use images to estimate and calculate environment parameters, and a controller to process the data. The controller utilizes the received information from image processors to estimate and calculate various environmental parameters which can be used to activate certain functions and devices.

6 Claims, 5 Drawing Sheets

FAST IMAGE SENSOR FOR BODY PROTECTION GEAR OR EQUIPMENT

BACKGROUND

Smart environments represent the next evolutionary development step in building, utilities, industrial, home, shipboard, and transportation systems automation. Like any sentient organism, the smart environment relies first and foremost on sensory data from the real world. Sensory data comes from multiple sensors of different modalities in distributed locations. The smart environment needs information about its surroundings as well as about its internal workings.

One of the important sensors which can be used for smart environment is image sensor. Image sensors are used primarily in digital cameras and in a large number of imaging devices used in industrial, media, medical, and consumer applications. Image sensors are standard measurement tools to convert light to digital signal to be processed by a control processor.

There are two image sensors that dominate digital photography today: CCD (charge-coupled device) and CMOS (complementary metal-oxide semiconductor). Each image sensor has its place in the world but comes with very distinct advantages and disadvantages.

Both CCD and CMOS image sensors start at the same point—they have to convert light into electrons. It is somehow similar to how solar cells work. One simplified way to think about the image sensor is to think of it as having a 2-D array of thousands or millions of tiny solar cells, each of which transforms the light from one small portion of the image into electrons Image sensors by definition convert electrons into voltage. However, there are different ways to get from point A to point B. A CMOS sensor has circuitry at every photo sensor. So each pixel is read simultaneously and then transmitted as digital information at once. This set up leaves the chip relatively crowded with circuitry but is extremely efficient and fast. In a CCD imager, the pixels are recorded on the chip and then one by one sent through the analog to digital converter to build the data. This takes more power than the CMOS process, but delivers much cleaner images.

CMOS sensors generally record less resolution than CCD sensors because they cannot physically sustain as many pixels on the plane of the chip. Each CMOS pixel is packaged with the circuitry to convert it to a digital signal, thus each sensor takes up more space.

CCD sensors tend to respond better to low light conditions than CMOS sensors. The clutter on CMOS sensors reduces the light sensitivity of the chip. It takes more lights to penetrate the thick layers, so dim light will not make it through. However, the advantage is that CMOS sensors facilitate adding gain to an image. Because circuitry is so close to each pixel, the camera can boost the exposure as it is recorded.

Wireless sensors are also used in smart environment. They are equipped with transmitters to convert signals from a control processor into a radio transmission. Then the reflected radio signal is interpreted by a receiver which then detects the received signal and sends it to a processor to be analyzed.

This patent application discloses use of image sensors for body protection gears. The image sensor is applied to estimate and calculate the distance and approaching speed of an external object, and use this information to decide to activate functions or devices that protect the body. This application also discloses use of both wireless sensor and image sensor for body protection.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
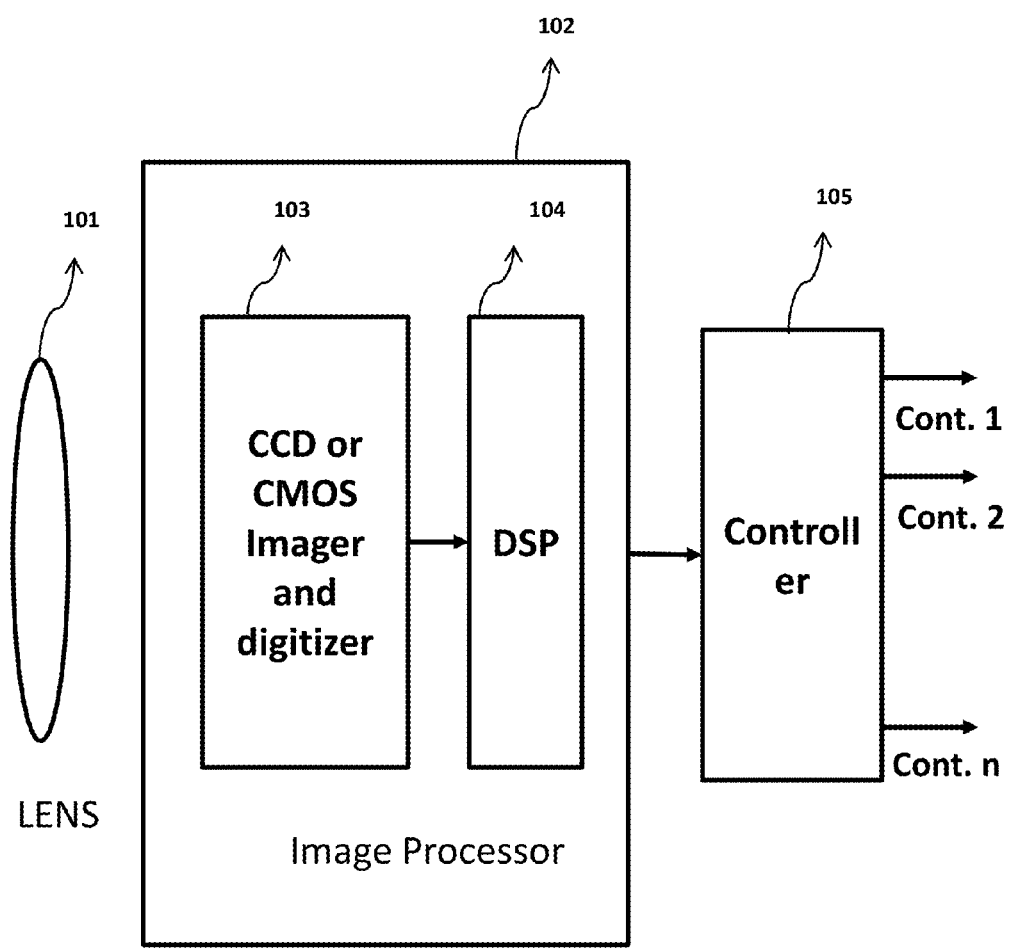
FIG. 1 shows an embodiment of an image sensor

FIG. 1 depicts an embodiment of image sensor 100. In general, image sensor 100 facilitates estimation and calculation of certain parameters of environment by using the images from the environment. The images are produced through a lens 101 and an image processor 102 which comprises of an imager/digitizer 103 and a DSP (digital signal processor) 104. The image is processed in DSP 104 to identify an external object. Then through use of the pixels from multiple images from multiple lenses the approaching speed and distance of the object from image sensor are estimated. The speed and distance information is passed to a controller 105 to decide what function or device has to be activated.

Image sensor system 100 includes, among other things, control processor 105, image processor 102 and lens 101.

In one embodiment, control processor 105, image processor 102 and lens 101 are components of image sensor 100 that could be used for various applications. For example, it can be used in robotics, automobiles, helmets, traffic monitoring, and etc.

Control processor 105 is for processing information received from image processor 102. Control processor 105 typically utilizes appropriate hardware and software algorithm to properly process the information.

In one embodiment, the timing of collecting image data in image sensor 100 is defined by control processor 105.

In one embodiment, the imager/digitizer of image sensor 100 is of CCD type.

In one embodiment, the imager/digitizer of image sensor 100 is of CMOS type.

In one embodiment, the image sensor uses the information from pixels that belong to an identified object produced from multiple images to estimate some parameters of the environment.

In one embodiment, the DSP 104 has a variety of functions. In general, DSP 104 is utilized for signal processing, calculation, estimation of environmental parameters.

Control Processor 105 has a variety of functions. In general, control processor 105 is utilized for activities, methods, procedures, and tools that pertain to the operation, administration, maintenance, and provisioning of image sensor. In one embodiment, control processor 105 includes a database that is used for various applications. The database can be utilized for analyzing statistics in real-time.

Control processor 105 also has a variety of thresholds. In general, control processor 105 provides controls to various functions and devices. Moreover, control processor 105 is a high capacity communication facility that connects primary nodes.

Figure 2:
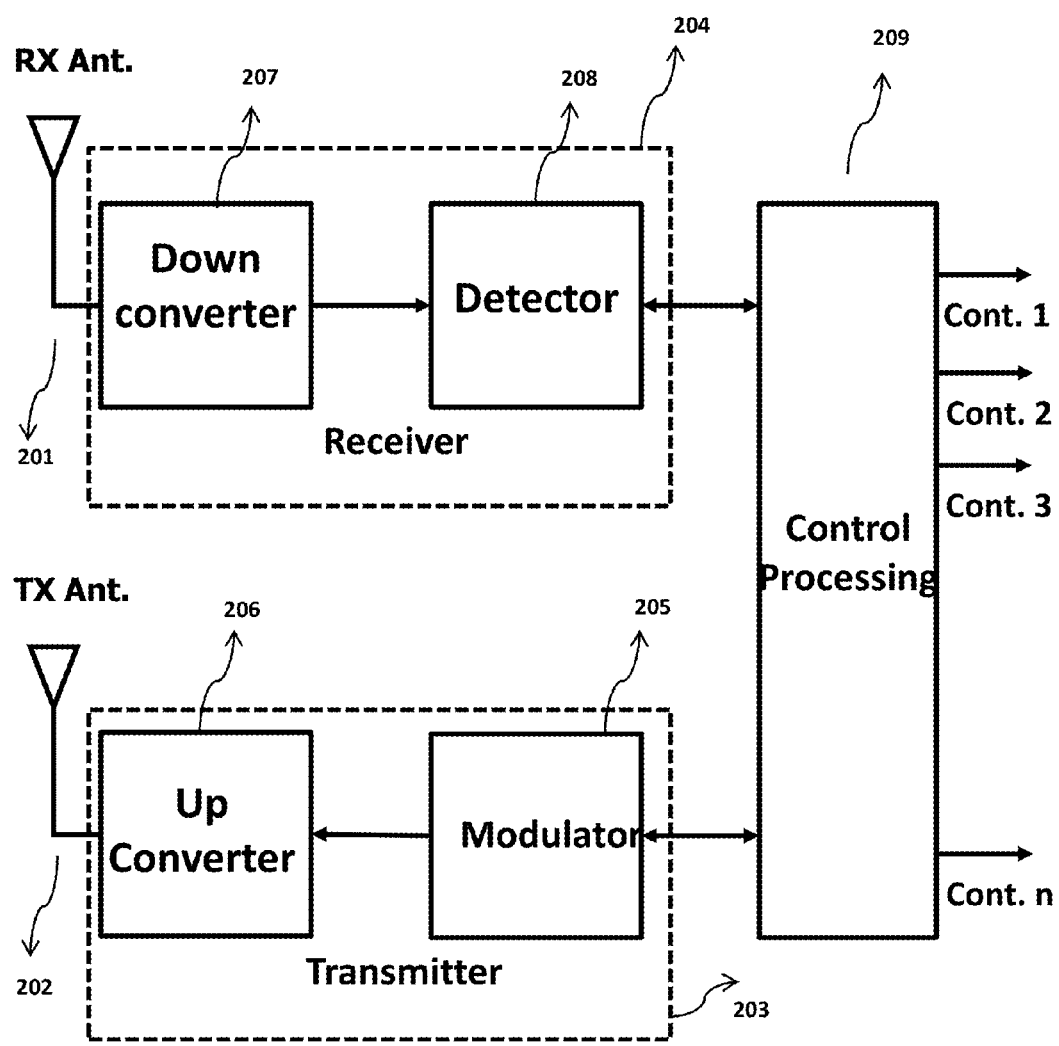
FIG. 2 illustrates an embodiment of a wireless sensor.

FIG. 2 depicts an embodiment of wireless sensor 200. In general, wireless sensor 200 facilitates estimation and calculation of certain parameters by transmitting a coded signal generated by a control processor 209 through a transmitter 203 and antenna 202 and then receiving the attenuated version of the same coded signal by an antenna 201 and receiver 204. For example, control processor 209 creates a random transmit pattern, send it to transmitter 203 for modulation by modulator 205 and up conversion to radio frequency by up convertor 206 and transmission through antenna 202. Then the reflected transmit signal from an object in the environment is received by antenna 201, down converted by down convertor 207, the transmitted pattern detected by detector 208 and send an indication to control processor 209. The down converter 207 also facilitates measurement of received signal strength to provide to control processor 209.

Wireless sensor system 200 includes, among other things, control processor 209, transmitter 203, transmit antenna 202, receive antenna 201, and receiver 204.

In one embodiment, control processor 209, transmit antenna 202, transmitter 203, receive antenna 201, and receiver 204 are components of wireless sensor 200 that could be used for various applications. For example, it can be used in robotics, automated automobiles, helmets, traffic monitoring, and etc.

In one embodiment, communications through wireless network 200 are by a transmit antenna 202 and a received antenna 201. Transmit and receive antennas are physically separated to provide sufficient isolation between transmit and receive antennas.

Control Processor 209 has a variety of functions. In general, control processor 209 is utilized for signal processing, calculation, estimation, activities, methods, procedures, and tools that pertain to the operation, administration, maintenance, and provisioning of wireless sensor. In one embodiment, control processor 209 includes a database that is used for various applications. The database can be utilized for analyzing statistics in real-time.

Control processor 209 also has a variety of thresholds. In general, control processor 209 provides controls to various components that are connected to it. Moreover, control processor 209 is a high capacity communication facility that connects primary nodes.

Figure 3:
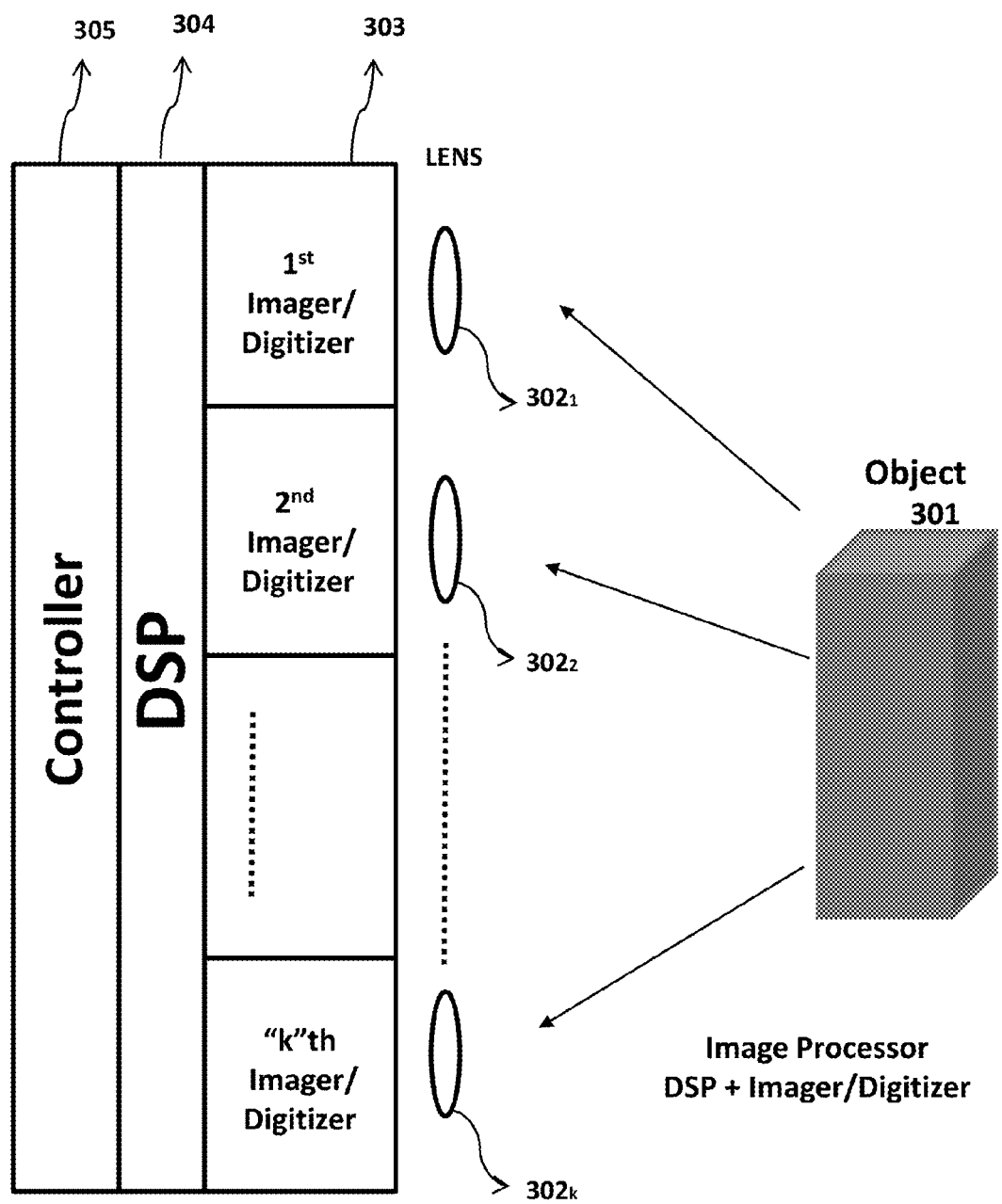
FIG. 3 shows an embodiment of image sensor interaction with one object.

FIG. 3 depicts an embodiment of image sensor interaction with one object. For instance, image sensor system includes controller 305, DSP 304, "k" Imager/digitizer 303, and lenses $302_1$ to $302_k$.

Controller 305 request information from one or more of imager/digitizers 303 by sending an activation signal. The imager/digitizers receive the activation signal and each record an image from external object 301.

In one embodiment, DSP 304 processes the recorded images from a number of lenses and extracts the needed information to estimate the required parameters from object 301 to send to controller 305. The controller 305 uses the information received from DSP 304 to decide which function or device needs to be activated.

Figure 4:
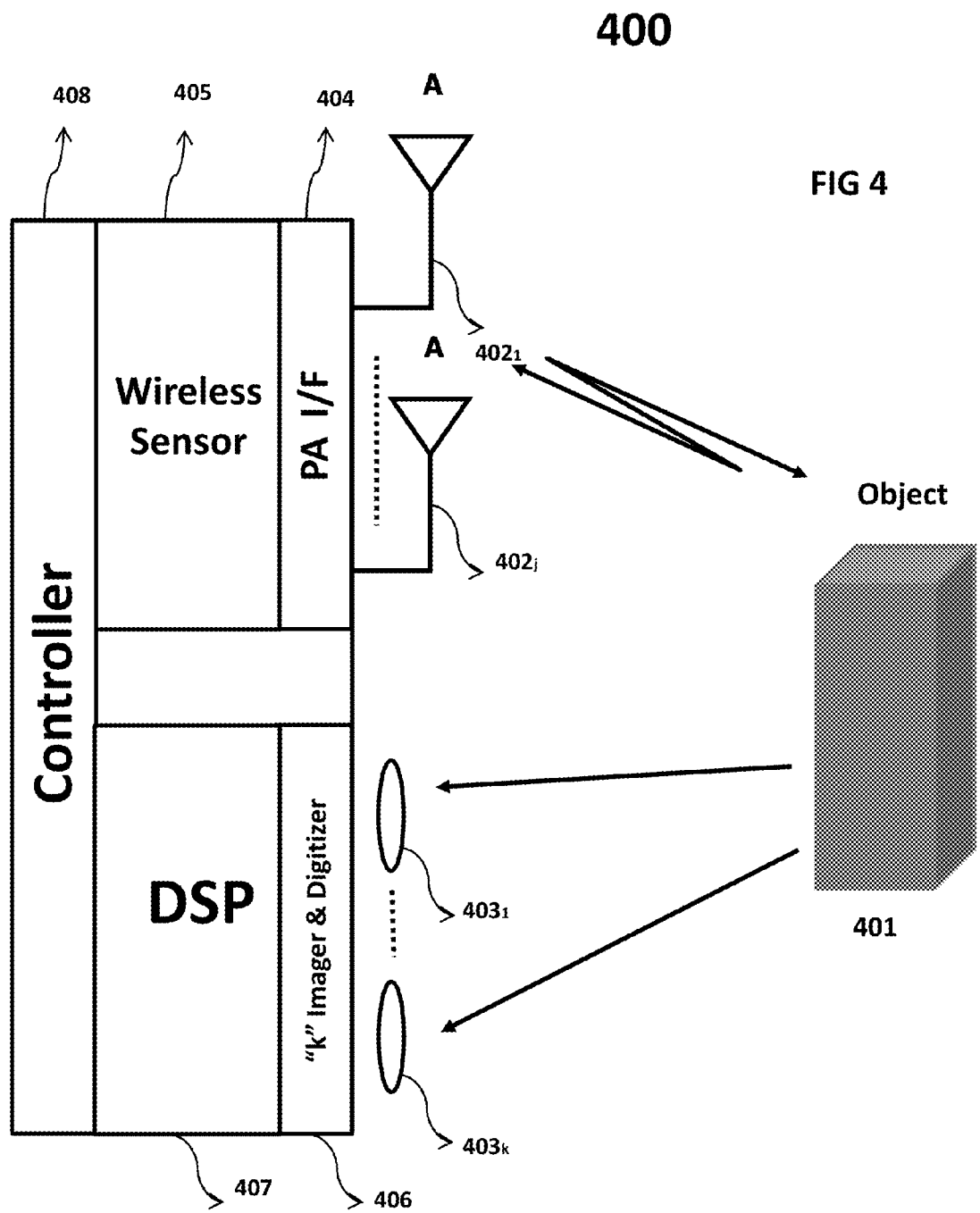
FIG. 4 illustrate an embodiment of both image sensor and wireless sensor interaction with one object.

FIG. 4 depicts an embodiment of image/wireless sensor interaction with an object. For instance, image/wireless sensor system includes controller 308, DSP 407, "k" Imager/digitizer 406, lenses $403_1$ to $403_k$, wireless sensor 405, antenna interface 404, and antennas $402_1$-$402_j$.

Controller 408 requests information from one or more of "k" imager/digitizers 406 and wireless sensor 405 by sending an activation signal. The imager/digitizer receives the activation signal then record an image from external object 301 and wireless sensor receives the activation signal then configures antennal interface 404 for transmission and reception from one or more of antennas $402_1$-$402_j$.

In one embodiment, DSP 407 processes the recorded images from a number of lenses and extracts the needed information to estimate the required parameters for object 401 to send to controller 408. Wireless sensor also configures antenna interface 404 for transmission and reception from one or more of the antennas $402_1$-$402_j$ and collect the appropriate information for object 401 to send to controller 408. The controller 408 uses the information received from DSP 407 and wireless sensor 405 to decide which function or device needs to be activated.

Figure 5:
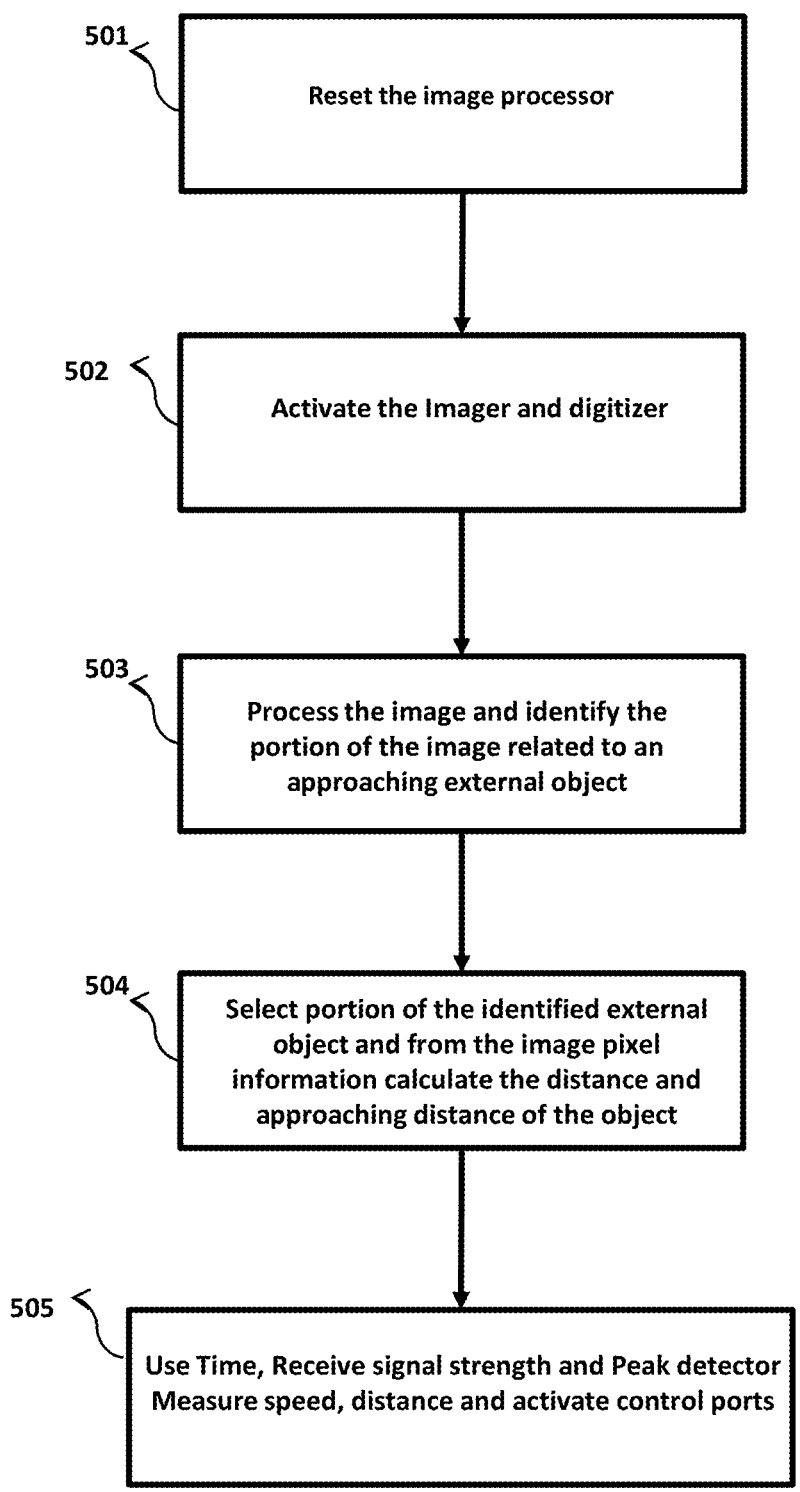
FIG. 5 illustrate embodiments of a flow chart of image sensor functions.

FIG. 5 depicts an embodiment of method 500 for using an image sensor to estimate and calculate environmental parameters. In various embodiments, method 500 is carried out by processor, imager/digitizers and lenses under the control of processes or executable instructions. The readable and executable instructions reside, for example, in a data storage medium such as processor usable volatile and non-volatile memory. However, the readable and executable instructions may reside in any type of processor readable storage medium. In some embodiments, method 500 is performed at least by one of the circuits described herein.

At 501 of method 500, the image processor is reset.

At 502 of method 500, the imager/digitizer is activated.

At 503 of method 500, the recorded image from imager/digitizer is processed to identify the portion of the image related to an approaching external object.

At 504 of method 500, a portion of the identified external object is selected and from the image pixels information the distance and approaching speed of the object is estimated.

At 505 of method 500, the controller uses the estimated distance and approaching speed of the external object to decide which function and device needs to be activated.

Various embodiments are thus described. While particular embodiments have been described, it should be appreciated that the embodiments should not be construed as limited by such description, but rather construed according to the following claims.

The invention claimed is:

1. A protection gear or equipment for monitoring an object in its surrounding environment comprising:
   a plurality of image sensors to provide a plurality of images of surrounding environment comprising: a plurality of lenses; a plurality of imagers;

a digital signal processing (DSP) to use a plurality of pixels from the plurality of images to calculate a distance and an approaching speed of an object in surrounding environment;

a wireless sensor to transmit a signal and detect the signal from surrounding environment comprising: a plurality of transmit and receive antennas;

a transmitter using a transmit antenna to transmit the signal, which is a coded random pattern signal, generated in a control processor where the transmission information is recorded;

a receiver using a receive antenna to receive the signal from surrounding environment, to detect the signal from the object in surrounding environment and send the signal to a control processor;

a control processor to use the signal to estimate a distance and an approaching speed of the object in surrounding environment, to receive the estimated distance and approaching speed of the same object from the DSP and to activate certain functions and devices based on the estimated distances and speeds of the object from the wireless sensor and the plurality of image sensors;

wherein the protection gear and equipment are worn by human and robot to protect their bodies against any impact from objects in surrounding environment.

2. The protection gear or equipment described in claim 1, wherein the plurality of image sensors use the information from pixels that belong to the object produced from the plurality of lenses and the plurality of imagers to estimate some parameters of the environment.

3. The protection gear or equipment described in claim 1, wherein the plurality of image sensors can use charge-coupled device (CCD) or complementary metal-oxide semiconductor (CMOS) technologies.

4. The protection gear or equipment described in claim 1, wherein the control processor in protection gear and equipment uses distance and speed information from two sources of image sensor and wireless sensor for more accurately activating a function or device.

5. The protection gear or equipment described in claim 1, wherein the wireless sensor can provide the speed of an approaching object to image sensor to calculate the distance of object from image sensor.

6. The protection gear or equipment described in claim 1, wherein the protection gear or equipment is used at least for one of helmets, robotics, automated automobile, traffic monitoring, and guided systems.

* * * * *